May 13, 1958   A. SAMBRAUS   2,834,454
APPARATUS FOR SEPARATING SOLID MATTER FROM LIQUIDS
Filed Aug. 10, 1954
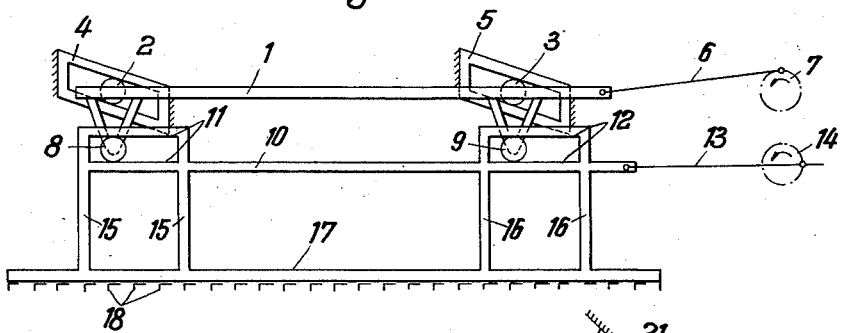
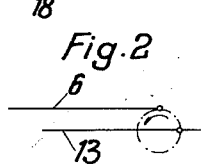
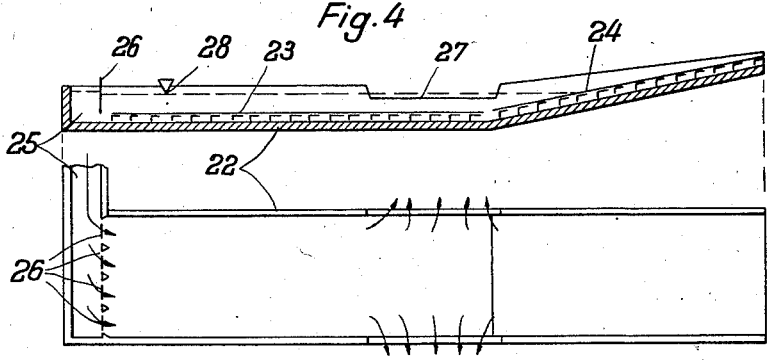
Inventor:
ADOLF SAMBRAUS
BY

2,834,454
APPARATUS FOR SEPARATING SOLID MATTER FROM LIQUIDS

Adolf Sambraus, Luneburg, Germany

Application August 10, 1954, Serial No. 448,818

Claims priority, application Germany August 13, 1953

5 Claims. (Cl. 198—224)

The present invention relates to improvements in apparatus for separating solid matter from liquids.

The invention is particularly concerned with apparatus of the kind in which the liquid containing the solid matter is fed into a settling tank in which a slow liquid flow is maintained by permitting liquid to spill out of the tank at one or more points remote from the delivery position to the tank, the solid matter deposited on the floor of the settling tank being removed by a mechanically operated scraper system.

In apparatus of the above kind as at present constructed, the settling tank is provided with a floor which extends for a portion of its length in a horizontal plane, the remaining length being inclined upwardly to provide a gradient extending above the liquid level in the tank and up which the solid matter deposited on the floor of the tank is caused to move for discharge from the tank by a scraper system which is arranged to sweep the horizontal and inclined portion of the floor of the tank, the scraping action being effected by causing the scraper system to traverse an elliptical path.

The constructions of apparatus of the above kind known hitherto have several disadvantages, particularly in the case of high delivery outputs with heavily silted waters such as occur, for example, in sugar factories. These disadvantages consist, inter alia, in that large deposits of sediments occur at the point of entry of the liquid to the settling tank with the result that damage frequently occurs to the scraper system at the end of the same closest to the delivery of the liquid. Also the mechanism operating the scraper system to obtain the ellipse-shaped movement of the scraper system is very complex and hence susceptible to faults. Furthermore, in the constructions known hitherto the scraper system may be forced into the deposited solid matter to be moved by its dead weight only, or alternatively the scraper system is not forced into the deposited solid matter to be moved with the force required in the case of a large deposit. Moreover, with the constructions existing hitherto, the joints and bearings of the scraper system are submerged, so that they are exposed to heavy wear by the solid matter contained water and must therefore be suitably sealed against ingress of foreign matter which would result in rapid breakdown of the apparatus.

The invention has for its object to provide an apparatus of the kind set forth in which the disadvantages set out above are eliminated.

The invention provides therefore a scraper mechanism for removing the solid matter deposited on the floor of the settling tank of apparatus of the kind set forth comprising a framework arranged exteriorly of the settling tank for supporting the scrapers in the settling tank said framework having independently movable frame members mounted so as to be displaceable simultaneously in a horizontal and a vertical plane respectively the combined movement imparted to the frame as a whole resulting in movement of the scrapers around an ellipitical path.

The framework may consist simply of two longitudinally extending frame members arranged one above the other in parallel spaced relationship, one of said frame members being mounted in guide means so as to be reciprocable in a horizontal plane with a parallel motion the other frame member being mounted in guide means arranged to displace the associated frame member in the vertical plane when the same is reciprocated the two frame members being inter connected so that the combined horizontal and vertical displacement imparts an ellipitical motion to scrapers carried by one of the frame members.

The reciprocating movement of the frame members are obtained by connecting the same to suitable driving means, the drive being arranged so that there exists a phase difference of 90° between the reciprocating movements of the frame members relative to one another.

The vertical displacement is obtained by for example supporting the frame members subjected to this motion by inclined guides which may be rectilinear, such guides may however be curved, the frame member having sliding blocks or rollers located in the guides.

The suspension of the scrapers from the lower frame member results in greater rigidity of the mechanism. In conjunction with this riguid suspension, a constrained pressing of the scrapers into the solids deposited on the floor of the settling tank may be effected by constructing the inclined guide means as slide guides. The slide guiles are, therefore, the preferred construction for the said inclined guide means.

According to a further feature of the invention the inclined guide means are stationary and are mounted on the longitudinal walls of the settling tank, while the sliding blocks or rollers are situated on the upper frame member, or vice-versa.

The arrangement may be so constituted that the upper frame member advantageously carries adjacent opposite ends rollers or the like, which are movable in horizontally disposed guides arranged parallel to the lower frame member.

Thus with the present invention all joints and bearings of the particularly simple and robust scraper mechanism are disposed outside the settling tank and are not submerged in liquid. The invention further permits classifiers to be built for the first time with any desired length, and consequently size, of settling tank, since it permits the use of frame members consisting of jointed sections.

The invention further provides that the inclined guides are rockable or adjustable about a horizontal axis transversely to the longitudinal direction for the purpose of adjusting the vertical stroke of the scrapers. This possibility of altering the vertical stroke leads to a particularly simple solution, on connecting all the inclined guides by a lever system, for effecting the simultaneous common adjustment—also provides according to the invention—of the frame members during drive for the purpose of varying the elliptical path of the movement (alteration of the ellipse minor axis).

The drive to the frame members disposed above and behind one another may be effected with the aid of two separate crankshafts, a double throw crankshaft or a single throw crankshaft in conjunction with a bell crank lever mounted so as to be rotatable at a fixed point. The said bell crank lever may be moved about a pivotal axis by a push rod lying almost vertically to the push rod of the lower frame, which is driven directly from the crankshaft, while the other arm of the bell crank lever acts upon the upper frame member push rod, which is movable approximately parallel to the said push rod.

In the case of settling tanks of considerable length which necessitate more than two guides or bearing rollers or the like for each framework, the frame members are constructed according to the invention as cantilever girders for the purpose of obtaining a statically determined structure (prevention of uncontrollable stresses, produced for example by inaccuracies on assembly).

In order to prevent solid deposits, which may damage the scrapers and the mechanism, in larger quantities at the point of entry of the liquid into the settling tank before the scraper mechanism, it is also provided according to the invention that the flow of liquid into the settling tank is effected through an ante-chamber, which is constituted by one or a plurality of partitions disposed next to one another and vertically movable and ensuring uniform distribution of the flow of liquid over the width of the tank. These partitions may be either individually or jointly movable, so that it is possible to regulate the flow of liquid to the tank according to requirements. The increased speed of the liquid in the relatively narrow gap between the tank floor and the partitions dependably effects rinsing of the solids from the front edge of the scraper arrangement, so that damage to the scraper adjacent to the partitions and any affecting of the mechanism through any transmission of surge forces which may occur are now completely precluded in contrast to the known classifiers.

In the case of settling tanks having discharge of the liquid over a spillway ridge in the upper longitudinal walls of the tank it has proved particularly advantageous according to the invention to dispose the spillway ridges approximately on or directly before the junction of the horizontal and inclined scraper parts.

Further features and details of the advantages resulting from the invention will be clear from the description hereinbelow of one exemplified embodiment, illustrated in the attached drawing, of the new arrangement. In the diagrammatic drawing:

Figure 1 shows the scraper mechanism in side elevation.

Figure 2 shows an alternative drive for the scraper mechanism.

Figure 3 shows a further alternative drive for the scraper mechanism.

Figure 4 shows a vertical longitudinal section through a settling tank.

Figure 5 shows a plan view of the settling tank according to Figure 4.

Referring to Figure 1 the scraper mechanism has the supporting framework for the scrapers such framework including an upper frame member 1 with the two guide rollers 2 and 3 reciprocable in two fixed guides 4 and 5, which are inclined to the horizontal, by a crank assembly 7 through a push rod 6. In consequence of the inclination of the fixed guides 4 and 5 the frame member 1 moves up and down at an incline, with a parallel motion. The lower frame member 10 with its guides 11 and 12 moves on the rollers 8 and 9, which are suspended from the upper frame member 1. The said lower frame member 10 is likewise moved by a crank assembly through a push rod 13. The lower frame member 10 supports the structures 15 and 16 which in turn carry a girder 17 to which the sheet metal scrapers 18 are secured. The scrapers may consist for example of angle iron. Given suitable displacement of the crank assemblies 7 and 14 (in the construction according to Figure 1 the crank assembly 7 must be in advance of the crank assembly 14 by about 90°), the combined movements of the frame members 1 and 10 result in movement of the scrapers 18 over an elliptical path.

Figure 2 shows the drive of the scraper mechanism with a double throw crankshaft, the push rods 6 and 13 each being driven by a crankpin displaced by about 90°. As seen in Figure 3, in a modification a single throw crankshaft only may be used, from which the push rod 13 is moved directly, but the push rod 6 on the other hand by interpositioning of a bell crank lever 20, which is rockable about a shaft 21 mounted so as to be stationary and the other arm of which is connected to the crank through a push rod 19 arranged substantially vertically to the push rod 13.

In Figures 4 and 5, a settling tank 22 is shown having a floor which extends horizontally for a portion of its length and then inclines upwardly. In Figure 4 the scraper system is indicated the horizontal scraper section being indicated by 23 and the inclined section by 24. Operation of the two scraper sections 23 and 24 is effected by analagous coupling of the two sections by a driving mechanism according to Figures 1, 2 or 3.

The supply of the water is effected through an ante-chamber 25. This ante-chamber is separated from the tank 22 by one or a plurality of partitions 26, which are vertically movable and the position of which may be adjusted either separately or together. The flow is regulated by the various settings of the partitions, so that the deposits of the solid matter are distributed. Thus the deposit of large quantities of solid matter are prevented, and which could cause damage to the scrapers as they are moved through the tank. Discharge of the water from the tank is effected over the spillway ridge 27, for example in the region where the horizontal and inclined parts 23, 24 of the scraper meet. The level of the water in the basin is indicated by a line 28.

I claim:

1. In a device of the character described for scraping a surface, in combination, scraper means; and combined positive motion transmitting and driving means for positively moving said scraper means along a substantially elliptical path having a major axis extending in a direction substantially coextensive with the surface and a minor axis substantially normal thereto, said combined positive motion transmitting and driving means comprising first slide guide means for guiding said scraper means for sliding movement in a direction parallel to said major axis, second slide guide means for mounting said first slide guide means for sliding movement in a direction inclined to said major axis so that when said first slide guide means is sought to be moved parallel to said major axis, said first slide guide means together with said scraper means moves parallel to said minor axis, and moving means for simultaneously moving said scraper means and said first slide guide means in said direction parallel to said major axis in such a manner that said scraper means moves along said substantially elliptical path.

2. In a device of the character defined in claim 1 each of said slide guide means including means forming at least one pair of parallel spaced upper and lower cam surfaces and a cam follower roller arranged between said surfaces.

3. In a device of the character defined in claim 1 each of said slide guide means including means forming at least two pairs of parallel spaced upper and lower cam surfaces, the two pairs being spaced from each other in the direction of said major axis, and at least two cam follower rollers, arranged, respectively, between the cam surfaces of each pair of cam surfaces.

4. In a device of the character defined in claim 3 said moving means including first moving means for reciprocating said scraper means in said direction parallel to said major axis and second moving means for simultaneously reciprocating said first slide guide means also in said direction parallel to said major axis, said first and second moving means being phased in such a manner that said scraper means are moved along said substantially elliptical path.

5. In a device of the character defined in claim 4 said first and second moving means being out of phase by approximately 90°.

References Cited in the file of this patent

UNITED STATES PATENTS

| 849,379 | Dorr | Apr. 9, 1907 |
| 996,624 | Dorr | July 4, 1911 |
| 2,033,213 | Weber | Mar. 10, 1936 |
| 2,097,747 | Suzuki | Nov. 2, 1937 |

FOREIGN PATENTS

| 590,344 | Germany | Dec. 30, 1933 |